United States Patent
Naden et al.

(10) Patent No.: US 7,702,353 B2
(45) Date of Patent: Apr. 20, 2010

(54) TRANSMIT POWER ALLOCATION IN A DISTRIBUTED MIMO SYSTEM

(75) Inventors: James Mark Naden, Hertford (GB); Fiona Wilson, Spellbrook (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1073 days.

(21) Appl. No.: 11/318,807

(22) Filed: Dec. 27, 2005

(65) Prior Publication Data

US 2007/0149236 A1 Jun. 28, 2007

(51) Int. Cl.
*H04B 7/00* (2006.01)

(52) U.S. Cl. .................. 455/522; 455/69; 375/267; 375/260

(58) Field of Classification Search .......... 455/522, 455/69, 453, 452, 509; 370/329; 375/260, 375/267, 229
See application file for complete search history.

(56) References Cited

U.S. PATENT DOCUMENTS

| | | | | |
|---|---|---|---|---|
| 2003/0072379 A1* | 4/2003 | Ketchum | ................. | 375/260 |
| 2004/0082356 A1* | 4/2004 | Walton et al. | ................. | 455/522 |
| 2004/0171359 A1* | 9/2004 | Tirkkonen et al. | ........ | 455/127.1 |
| 2004/0252632 A1* | 12/2004 | Bourdoux et al. | ............ | 370/210 |
| 2005/0249159 A1* | 11/2005 | Abraham et al. | ............ | 370/329 |
| 2005/0265281 A1* | 12/2005 | Ketchum | ................. | 370/328 |
| 2006/0067417 A1* | 3/2006 | Park et al. | ................. | 375/260 |
| 2006/0171347 A1* | 8/2006 | Attar et al. | ................. | 370/328 |
| 2007/0291702 A1* | 12/2007 | Nanba et al. | ................. | 370/336 |
| 2008/0108310 A1* | 5/2008 | Tong et al. | ................. | 455/69 |
| 2008/0165883 A1* | 7/2008 | Jiang et al. | ................. | 375/267 |
| 2009/0034456 A1* | 2/2009 | Peng et al. | ................. | 370/329 |
| 2009/0080376 A1* | 3/2009 | Almgren et al. | ............. | 370/329 |

FOREIGN PATENT DOCUMENTS

EP 1255369 A 11/2002

OTHER PUBLICATIONS

Lau, "Proportional Fair Space-Time Scheduling for Wireless Communications", IEEE Transactions on Communications, vol. 53, No. 8, Aug. 2005, pp. 1353-1360.
Dohler, "Throughput of Distributed—MIMO Multistage Communiction . . . " Telecommunicatios and Networking ICT, 2004 Aug. 6, 2004, pp. 450-460.

* cited by examiner

*Primary Examiner*—Tan Trinh
(74) *Attorney, Agent, or Firm*—Barnes & Thornburg LLP (57) ABSTRACT

Allocate power so as to maximise the throughput of each user of a multi-user MIMO group, with the constraint that over time all users in the group have equal throughput. This differs from equal capacity per slot in that each user may be assigned multiple slots as well as unequal power. This is illustrated in FIG. 4. Total throughput is maximised on any given slot for any two users. Power is shared between the spatial modes such that the total number of slots used by the two users is minimised. The membership of the MIMO group may change between slots and thus throughput is not necessarily equalised on a slot by slot basis.

14 Claims, 4 Drawing Sheets

TRANSMIT POWER ALLOCATION IN A DISTRIBUTED MIMO SYSTEM

BACKGROUND OF THE INVENTION

1. Field of the Invention

This invention relates to the allocation of transmit power in the downlink of a distributed MIMO cellular radio network to achieve generally equal throughput for each mobile terminal whilst generally maximizing throughput for the network.

2. Description of the Related Art

It is often desirable to provide a service uniformly within the coverage area of a cellular wireless network, despite variations in propagation conditions experienced by users in different locations. Conventionally this may be achieved by a scheduling technique in which the base station of the network spends a greater proportion of time transmitting to users in areas of poor reception and compensates by using a higher level of modulation (and hence higher data rate) for users with better reception.

This prior art technique is equally applicable to SISO (single input, single output) systems, in which a single spatial mode of the wireless channel is employed for communication between the base station and each mobile terminal, and to MIMO (multiple input, multiple output) systems, in which multiple spatial modes of the wireless channel are employed for communication between the base station and each mobile terminal.

A further aspect of a MIMO system concerns the allocation of the transmitter power between the spatial modes of the channel between the base station and an individual mobile terminal. In such a system, it is desirable that the power be allocated so as to maximise the capacity of the MIMO channel. Where multiple spatial modes of the wireless channel are employed for communication between the base station and each mobile terminal, a technique known as "water-pouring" may be employed, in which the power of the transmitter is allocated so as to maximise the capacity of the channel as a whole. Although this technique results in significantly improved capacity, it often requires that all of the transmitter power be allocated to one of the spatial modes. It can therefore only be used if all of the modes of the channel are used to support communication with a single mobile terminal, as in conventional MIMO systems. If it were to be employed in a system where, for example, each mode of the channel were to be used to support communication with a different mobile terminal, then those mobile terminals reliant upon modes with no power allocation would find themselves effectively outside the coverage of the base station, which typically is undesirable. A MIMO system in which the spatial modes serve more than one mobile station is known as a distributed MIMO system. It is also sometimes known as Virtual MIMO or Cooperative MIMO.

SUMMARY OF THE INVENTION

The invention is concerned with use on the downlink—from the base station to a mobile terminal—of a cellular wireless system employing distributed MIMO channels in which one or more spatial modes of a distributed MIMO wireless channel are employed for communication between the base station and a mobile terminal and further spatial modes of the wireless channel are simultaneously employed for communication between the base station and further mobile terminals.

This arrangement may be repeated with additional distributed MIMO wireless channels serving additional mobile terminals in the coverage area of the cellular wireless system. The transmitter power is allocated between the spatial modes of each distributed MIMO channel so as to maximise the equal throughput rate within the coverage area of the cellular wireless system. This is shown to provide a higher equal throughput rate than alternative methods, allowing the support of a greater number of mobile terminals, and without the coverage penalty associated with water-pouring.

In a first aspect, the invention provides a method of allocating power in the downlink of a distributed MIMO system comprising selecting a group of mobile terminals to be served simultaneously, performing channel measurements to derive information about the channel for each group, calculating the maximum equal throughput for the selected group based on the channel measurements and deriving power allocations for each mode of the said channel based on the said channel information and the calculated maximum equal throughput.

In a second aspect, the invention provides a method of allocating power in the downlink of an SDMA cellular radio system having a plurality of downlink beams, which are typically adaptive but may be fixed, comprising selecting a group of mobile terminals to be served simultaneously by a respective group of beams, performing channel measurements to derive information about the channel for each group of beams, calculating the maximum equal throughput for the selected group of beams based on the channel measurements and deriving power allocations for each beam based on the said channel information and the calculated maximum equal throughput.

In a third aspect, the invention provides a base station for a distributed MIMO system comprising an antenna having a plurality of spatially distinct radiating elements, a transmitter coupled to the antenna and operable to vary transmit power separately for each said element, a receiver operable to receive channel information about channels to mobile stations and a scheduler arranged to create groupings of mobile stations to be served simultaneously by the base station, the transmitter being further arranged to calculate the maximum equal throughput for the selected group of modes based on the channel measurements and to derive power allocations for each mode based on the said channel information and the calculated maximum equal throughput.

In a fourth aspect, the invention provides a base station for an SDMA cellular radio system comprising an antenna operable to produce a plurality of downlink beams, which are typically adaptive but may be fixed, a transmitter coupled to the antenna and operable to vary transmit power separately for each beam, a receiver operable to receive channel information about channels to mobile stations and a scheduler arranged to create groupings of mobile stations to be served simultaneously by the base station, the transmitter being further arranged to calculate the maximum equal throughput for the selected group of mobile stations based on the channel measurements and to derive power allocations for each beam based on the said channel information and the calculated maximum equal throughput.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings in which.

DETAILED DESCRIPTION OF THE INVENTION

As discussed above, in a distributed MIMO system there are several possible ways of servicing the mobile stations in a cell (i.e. that group of mobile stations being serviced by the same set of base station antennas). Effectively, there are three main degrees of freedom. Firstly, the duration (or dwell) of transmissions to any one mobile station may be varied to increase or decrease the volume of data transmitted to that terminal. Thus more time slots may be allocated to a particular mobile station to increase the volume of data transmitted to that mobile station (for a given data rate). However, since the total transmission time is a finite resource, increased dwell for one mobile station will result in reduced dwell for other mobile stations sharing the same cell.

Secondly, the modulation level may be varied. Higher levels of modulation generally result in higher data rates (i.e. more data transmitted over a given period of time). However, the capability to increase modulation levels is limited by the channel conditions to each mobile station. Generally, as channel conditions deteriorate, for example, as a result of increased distance between the mobile station and the base station, or obstructions such as buildings or hills in the signal path, higher modulation levels become progressively unusable.

Thirdly, the transmission power may be varied. Generally, within regulatory constraints, consideration of interference with other base stations and antennas at the same base station and the capability of the transmission equipment at the base station, higher power transmissions improve channel conditions. This in turn allows higher modulation levels and higher data rates.

It is desirable to provide a degree of fairness between mobile stations so that each receives an equal volume of data (or throughput). Some of the trade-offs between approaches which have been considered by the inventors are discussed below. The optimal solution is then discussed in further detail.

Equal Power

Figure 1:
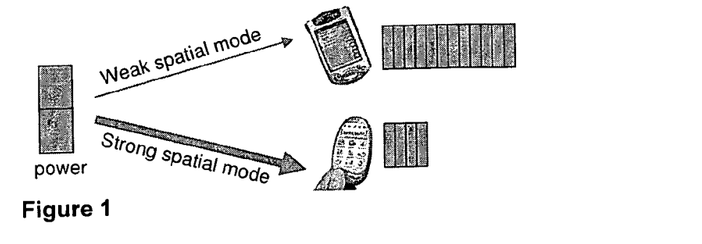
FIG. 1 is a schematic diagram showing a distributed MIMO system operating in equal power mode.

The simplest approach is to allocate the same power to each spatial mode, where each spatial mode is assigned to a different member of a multi-user MIMO group. This is illustrated in FIG. 1. The power is equally distributed between the two users. The weak spatial mode must be assigned many slots to achieve a given data rate.

Water-Pouring

Figure 2:
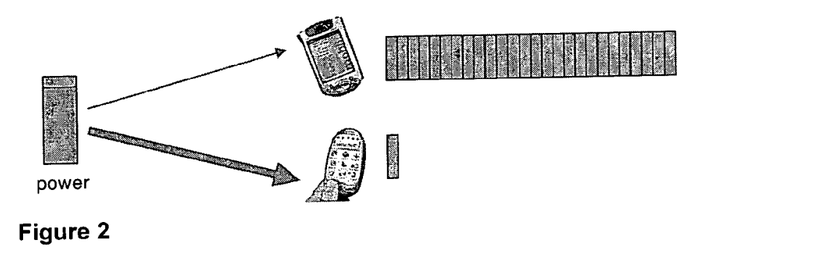
FIG. 2 is a schematic diagram showing a distributed MIMO system operating in water pouring mode.

Maximise the aggregate throughput of the multi-user MIMO group at the expense of fairness. This is illustrated in FIG. 2. As discussed above, a very weak spatial mode may receive no allocation at all and may effectively be excluded from coverage. Power tends to be concentrated on the strong spatial mode (or modes). The weak mode must be assigned many slots to achieve a given data rate or may never be served at all even though it is within range of the base station.

Equal Capacity Per Slot

Figure 3:
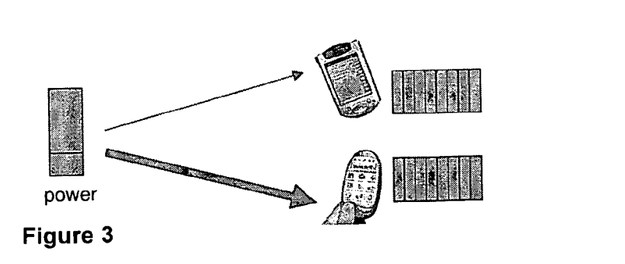
FIG. 3 is a schematic diagram showing a distributed MIMO system operating in an equal capacity per slot mode.

Assign power such that the data-rate achieved in a single slot is equalised across the users of a multi-user MIMO group. As illustrated in FIG. 3, both users need the same moderate number of slots to support a given data rate.

Maximum EQT (Equal Throughput)

Figure 4:
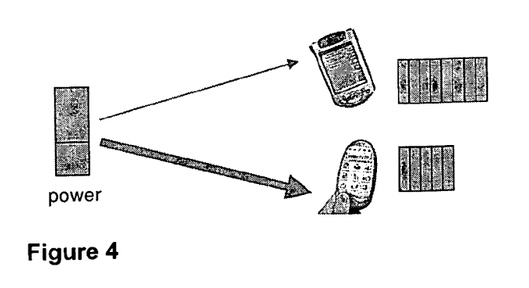
FIG. 4 is a schematic diagram showing a distributed MIMO system operating in a maximum equal throughput mode in accordance with the invention.

Allocate power so as to maximise the throughput of each user of a multi-user MIMO group, with the constraint that over time all users in the group have equal throughput. This differs from equal capacity per slot in that each user may be assigned multiple slots as well as unequal power. This is illustrated in FIG. 4. Total throughput is maximised on any given slot for any two users. Power is shared between the spatial modes such that the total number of slots used by the two users is minimised. The membership of the MIMO group may change between slots and thus throughput is not necessarily equalised on a slot by slot basis.

This is the optimum approach to maximise the cell EQT capacity because maximisation of the equal throughput for each multi-user MIMO group independently leads to a maximum equal throughput for the cell as a whole.

Although these examples have been given in connection with pairs of mobile stations in each multi-user MIMO group, it will be appreciated by the skilled person that the principle may be extended to group memberships greater than two.

ILLUSTRATIVE DOWNLINK EXAMPLE

With reference to FIG. 1, a base station 2 communicates with two mobile terminals, $m_1$ and $m_2$, over a channel H. The base station 2 uses two antennas 4-1 and 4-2 to excite two orthogonal spatial modes of the channel. Orthogonality with respect to communication with other mobile terminals with which the base station communicates in a similar fashion using other MIMO channels may be achieved in known ways using code, frequency and/or time multiplexing.

Signal $s_1$ is transmitted to mobile terminal $m_1$ using a first mode of the channel with eigenvalue $\lambda_{11}$. Signal $s_2$ is transmitted to mobile terminal $m_2$ using a second mode of the channel with eigenvalue $\lambda_{22}$. The signals are transmitted simultaneously within the channel and occupy the full bandwidth of the channel. The transmitter is assumed to have the requisite knowledge of the channel derived, for example, from pilot signal-based channel measurements.

The throughput of a signal is defined as the data rate of that signal multiplied by the time for which it is transmitted, known as the dwell time. As discussed above, it is desirable for the total throughput to be as large as possible (to maximise cell capacity) and also for each mobile terminal to receive an equal share of throughput. The average data rate provided to each mobile terminal under such conditions is referred to as the equal throughput rate.

In the present invention, the transmit power allocated to each signal by the base station is adjusted to maximise the equal throughput rate in the coverage area of the cellular wireless system and the number of slots allocated to each is also adjusted. Performance is compared to two alternative methods of achieving these aims: in the first, the transmit power is allocated equally to each signal by the base station and the dwell time is varied to achieve equal throughput to each mobile terminal (FIG. 1); in the second, the transmit power allocated to each signal by the base station is adjusted to achieve equal capacity to each mobile terminal and both signals are transmitted continuously (FIG. 3).

Figure 5:
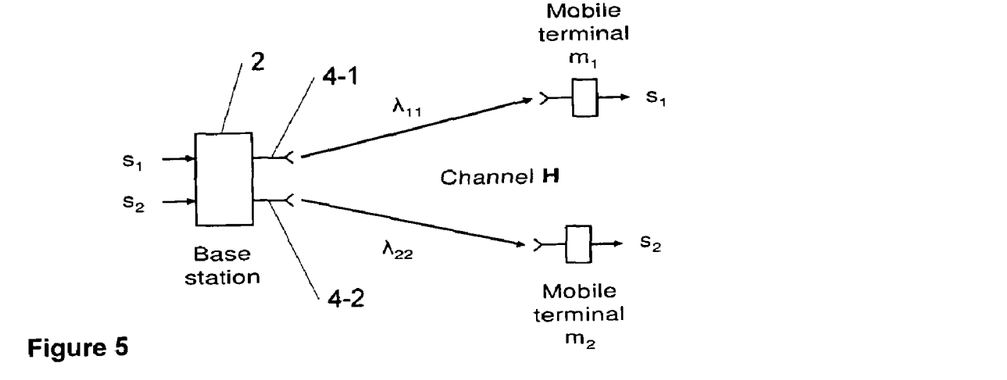
FIG. 5 is a schematic diagram of a distributed MIMO system.

To compare these methods, let us assume Shannon coding and calculate the equal throughput rate of the channel in each case. Let the fraction of the total power available at the transmitter that is allocated to signal $s_1$ be $\alpha$. The fraction allocated to signal $s_2$ is therefore $(1-\alpha)$. The ratio of the signal power to the noise power and interference received at each mobile terminal $m_1$, $m_2$ is specified by the eigenvalues $\lambda_{11}$ and $\lambda_{22}$ (FIG. 5). Let the channel H have unit bandwidth.

Equal Power (FIG. 1)

To establish a reference for the purposes of comparison, we consider the case in which equal power is allocated to each of the signals $s_1$ and $s_2$. This is achieved by setting $\alpha=0.5$. Hence, $$C_1 = \log_2(1+\lambda_{11}\alpha)$$

$$C_2 = \log_2(1+\lambda_{22}(1-\alpha))$$

where $\alpha=0.5$

However, the capacities of the two modes, $C_1$ and $C_2$, will not typically be equal under this condition since the channels are not necessarily the same. To achieve equal throughput, the dwell time $\tau_i$ for each signal is adjusted such that it is in inverse proportion to the capacity of the corresponding mode:

$$\tau_i \propto \frac{1}{C_i} \quad i \in \{1, 2\}$$

Under this condition, the equal throughput rate is given by $$\rho_{ep} = \frac{1}{\sum_i p_i \frac{1}{C_i}} \quad i \in \{1, 2\}$$

Here, $p_i$ is the likelihood of the mode with capacity $C_i$ occurring, which in our example is ½. Hence, $$\rho_{ep} = \frac{2 C_1 C_2}{C_1 + C_2}$$

where $\rho_{ep}$ is the equal throughput rate of signal $s_1$, which in this example is equal to the equal throughput rate of signal $s_2$.

Equal Capacity (FIG. 3)

In the second method, equal throughput is achieved by adjusting the proportion of the transmitter power allocated to each signal such that the capacities of the two modes of the channel are made equal:

$$C_1 = C_2$$

Hence, $$\log_2(1+\lambda_{11}\alpha) = \log_2(1+\lambda_{12}(1-\alpha))$$

This occurs when $$\alpha = \frac{\lambda_{22}}{\lambda_{11}+\lambda_{22}}$$

The equal throughput rate is then $$\rho_{ec} = \log_2\left(1 + \frac{\lambda_{11}\lambda_{22}}{\lambda_{11}+\lambda_{22}}\right)$$

where $\rho_{ec}$ is the equal throughput rate of signal $s_1$, which is equal to the equal throughput rate of signal $S_2$.

Maximum Equal Throughput

Ideally, the transmitter power allocated to the two signals $s_1$ and $s_2$ should be chosen such that the equal throughput rate is a maximum for the distributed MIMO channel, as it can be shown that this provides the maximum equal throughput rate for the coverage area of the cellular wireless system as a whole. We firstly examine this ideal case.

As in previous examples, let $$C_1 = \log_2(1+\lambda_{11}\alpha)$$

$$C_2 = \log_2(1+\lambda_{22}(1-\alpha))$$

Then the equal throughput rate is $$\rho_{eqt} = \frac{1}{\sum_i p_i \frac{1}{C_i}} \quad i \in \{1, 2\} \qquad \text{Eqn. 1}$$

$$= \frac{1}{p_1 \frac{1}{\log_2(1+\lambda_{11}\alpha)} + p_2 \frac{1}{\log_2(1+\lambda_{22}(1-\alpha))}}$$

To determine the maximum value of the equal throughput rate we differentiate with respect to $\alpha$ and set equal to zero.

$$\frac{\partial}{\partial \alpha}\rho_{eqt} = 0$$

$$\Rightarrow \frac{\partial}{\partial \alpha}\left[\frac{1}{p_1 \frac{1}{\log_2(1+\lambda_{11}\alpha)} + p_2 \frac{1}{\log_2(1+\lambda_{22}(1-\alpha))}}\right] = 0$$

Unfortunately there is no easy solution to this equation. Therefore, we determine the minimum of $1/\rho_{eqt}$ (Eqn. 1) instead.

$$\frac{\partial}{\partial \alpha}\frac{1}{\rho_{eqt}} = 0 \qquad \text{Eqn. 2}$$

$$\Rightarrow \frac{\partial}{\partial \alpha}\left[\begin{array}{c}p_1 \frac{1}{\log_2(1+\lambda_{11}\alpha)} + \\ p_2 \frac{1}{\log_2(1+\lambda_{22}(1-\alpha))}\end{array}\right] = 0$$

$$\Rightarrow \frac{1}{\ln[1+\lambda_{22}(1-\alpha)]^2}\frac{\lambda_{22}}{1+\lambda_{22}(1-\alpha)} - \frac{1}{\ln(1+\lambda_{11}\alpha)^2}\frac{\lambda_{11}}{1+\lambda_{11}\alpha} = 0$$

This can be solved numerically to determine the optimum value of $\alpha$ corresponding to a given set of eigenvalues.

The analysis done here is in pairs for convenience and clarity; with more than two, the complexity may be expected to increase and hence the description will become more difficult to understand, although it will be the same concept in principle. The skilled person will appreciate that for implementation purposes it is possible to use the invention with MIMO groups having more than two mobile stations.

It has been found that if there are additional mobile terminals forming further MIMO pairs in the system, then the value of α chosen to maximise the equal throughput of an individual MIMO pair is also the value required to maximise the equal throughput of the entire system. Thus each MIMO pair has an optimum value of α and this value may (indeed probably will) be different for each pair but if each α is chosen to maximise the throughput of its associated pair then the overall throughput of the entire system will be maximised.

Relative Performance

To compare the performance of the methods, we form the ratios of the equal throughput rates for each method to the equal throughput rate of the equal power method and test these with a representative set of eigenvalues derived from simulation. This gives the following results:—

$$R_{ec} = \frac{\rho_{ec}}{\rho_{ep}} = 1.00$$

$$R_{eqt} = \frac{\rho_{eqt}}{\rho_{ep}} = 1.56$$

It is apparent from the results obtained that allocating the transmitter power so as to make the capacities of the two modes of a MIMO pair equal makes no improvement compared to allocating equal power to each mode. However, our proposed method of allocating power within a MIMO pair, so as to maximise the equal throughput rate, shows a significant improvement, enabling an increase of over 50% in the throughput of mobile terminals supported.

The improvement in throughput can be used to improve the throughput of each of the individual terminals by 56% or to improve the numbers of terminals supported at the original rate by 56% or some in between case in which the number of terminals increases a little and the throughput per terminal increases a little bit such that the total increase equals 56%.

Practical Implementation

It is, of course, impractical to realise equal throughput for each distributed MIMO channel independently. Where the MIMO channel is distributed between two mobile terminals, for example, whenever one is served, so is the other, so their dwell times must be equal and, as a consequence, the one with the lower rate will always lag in throughput compared to the one with the higher rate.

According to our preferred embodiment therefore, the mobile terminals in the coverage area are formed into groups, each group being supported by an individual distributed MIMO channel. The mobile terminals chosen by the scheduler to form the first group are typically those with the lowest throughput to date; the second group is formed from the two mobile terminals with the third and fourth lowest throughputs to date; and so on. The aggregate throughput of the mobile terminals in each group is then calculated and the groups are scheduled based on this aggregate throughput to realise equal throughput for all groups and hence for all distributed MIMO channels. That is, the group with the lowest aggregate throughput prior to the current time period will be scheduled in the current time period. Typically, therefore, low rate terminals will be scheduled more often and the power distribution in the group will be determined to maximise throughput by solving for α in Eqn. 2 above.

Note that the channels may be simultaneously active distributed MIMO channels serving different groups of mobile terminals within the coverage area of the cellular wireless system or, where an individual channel is time varying, may be instances of the same distributed MIMO channel at different times. An essential aspect of this embodiment is that the scheduler chooses the members of each group, as this enables equal throughput to be achieved within each group as well as between groups.

As in previous examples, let $$C_1 = \log_2(1 + \lambda_{11}\alpha)$$

$$C_2 = \log_2(1 + \lambda_{22}(1-\alpha))$$

However, we now calculate the aggregate throughput rate for the pair of mobile terminals constituting the group:

$$\rho_{agg} = \sum_i C_i \ i \in \{1, 2\}$$
$$= \log_2(1 + \lambda_{11}\alpha) + \log_2(1 + \lambda_{22}(1-\alpha))$$

To determine the maximum value of the equal throughput rate for the coverage area as a whole we differentiate with respect to α and set equal to $$\frac{\partial}{\partial \alpha} \rho_{eqt} = 0 \qquad \text{Eqn. 3}$$

$$\Rightarrow \frac{\partial}{\partial \alpha}\left(\frac{1}{\beta + \frac{1/m}{\sum_i C_i}}\right) = 0$$

$$\Rightarrow \frac{\partial}{\partial \alpha}\left[\frac{1}{\beta + \frac{1/m}{\log_2(1+\lambda_{11}\alpha) + \log_2(1+\lambda_{22}(1-\alpha))}}\right] = 0$$

Here, β is the sum of all such similar terms for all other groups in the coverage area and m is the total number of groups. These have their own power allocation parameters but these are independent of α.

Unfortunately there is no easy solution to this equation. Therefore, we determine the minimum of the inverse instead.

$$\frac{\partial}{\partial \alpha} \frac{1}{\rho_{eqt}} = 0$$

$$\Rightarrow \frac{\partial}{\partial \alpha}\left(\beta + \frac{1/m}{\sum_i C_i}\right) = 0$$

$$\Rightarrow \frac{\partial}{\partial \alpha}\left[\beta + \frac{1/m}{\log_2(1+\lambda_{11}\alpha) + \log_2(1+\lambda_{22}(1-\alpha))}\right] = 0$$

$$\Rightarrow \alpha = \frac{1}{2}\left(\frac{1}{\lambda_{22}} - \frac{1}{\lambda_{11}}\right) + \frac{1}{2}$$

From simulation results, the improvement in equal throughput rate obtained when distributing the transmit power using this method is ~18% relative to an equal allocation of transmit power, obtained by setting α=0.5.

This value for α is identical to that obtained if "water pouring" is assumed and results in maximum aggregate capacity for the group. The essential difference in this case is that the scheduler selects the members of each MIMO group and these vary from time to time as a consequence. Thus, although in any one interval no power may be allocated to a particular signal, the change in group membership will result in that mobile terminal being compensated in a later interval, avoiding the impact on coverage noted in the pure water pouring example.

Figure 6:
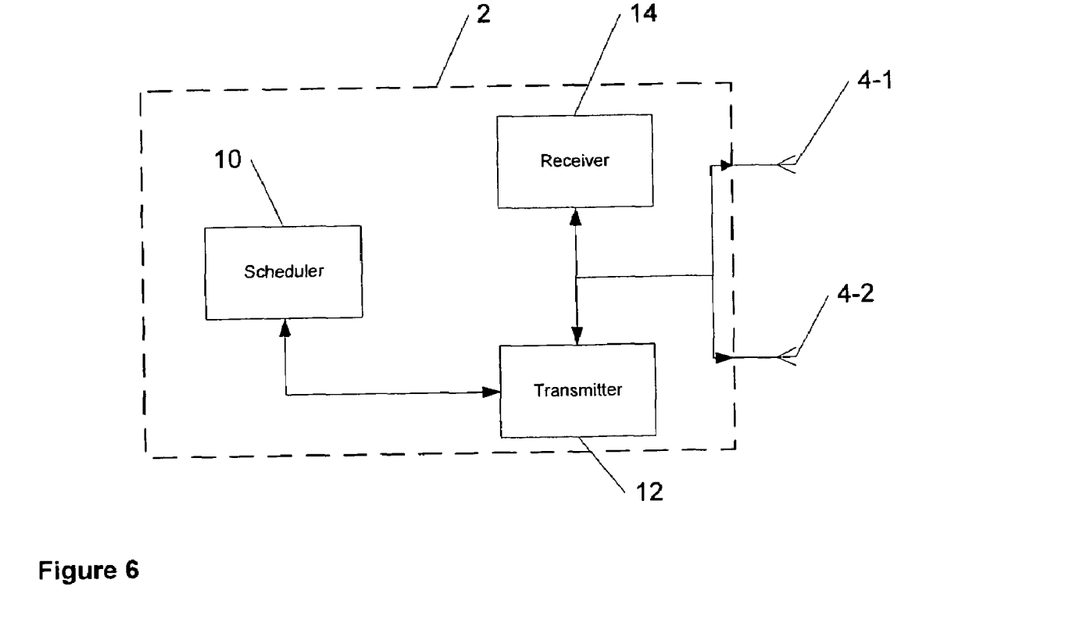
FIG. 6 is a schematic diagram of a base station for a distributed MIMO system in accordance with the invention.

With reference to FIG. 6, suitable hardware comprising a base station 2 having antennas 4-1 and 4-2. The base station 2 includes a scheduler 10 arranged to create groupings of mobile stations to be served simultaneously by the base station 2. The choices are made by examining the aggregate throughput as described above in connection with Eqn. 4 and with object of equalizing throughput over time for all terminals.

A transmitter 12 is coupled to the antennas 4-1 and 4-2 and is operable to vary transmit power separately for each antenna so that the transmit power may be varied as dictated by the maximum equal throughput equation (Eqn. 2). To derive the channel information, a receiver 14 typically receives channel measurements made my mobile stations following receipt of a known pilot signal. This may be used to derive the eigenvalues for Eqn. 2

Figure 7:
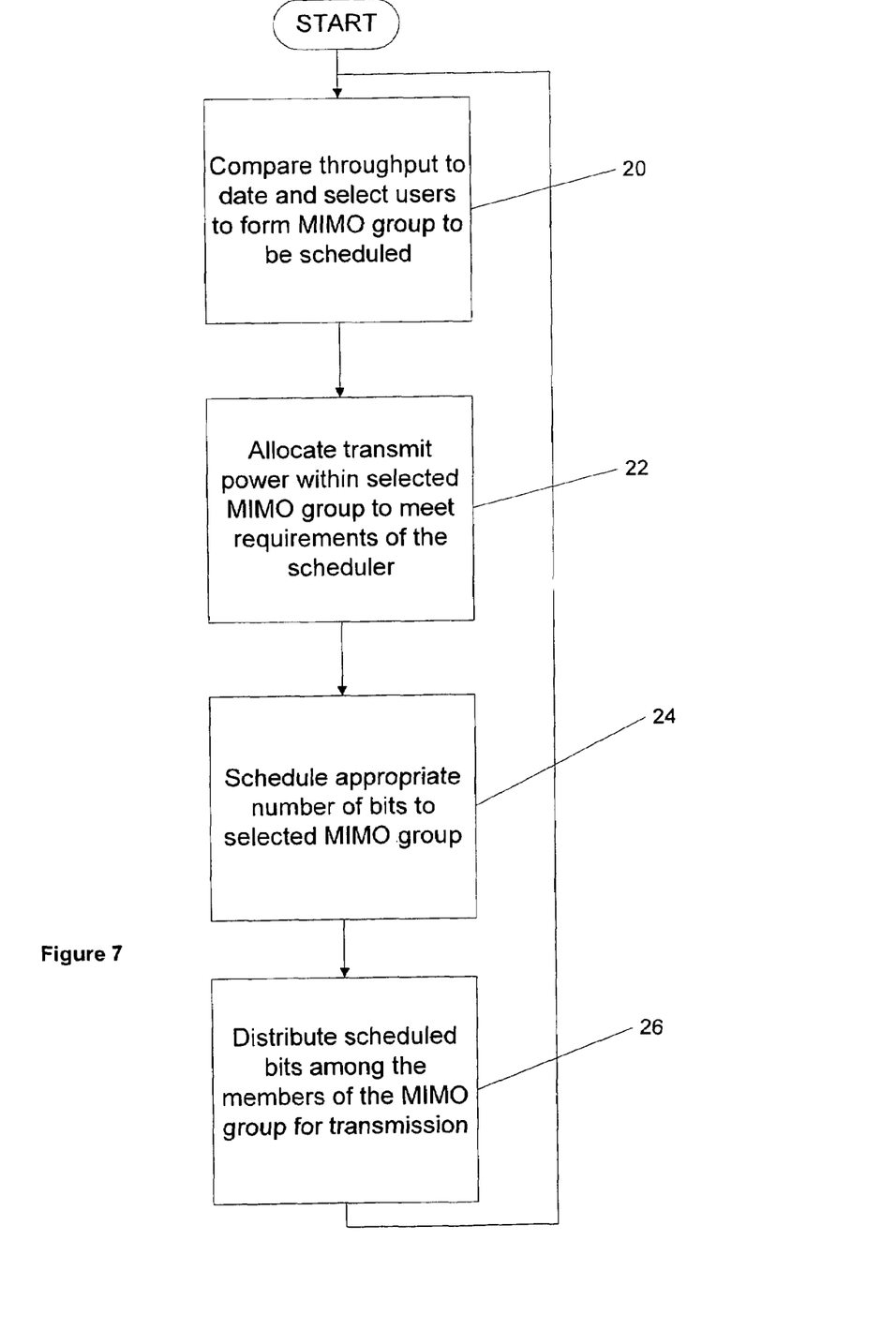
FIG. 7 is flow chart showing scheduling and power allocation steps in accordance with the invention.

FIG. 7 sets out steps to be carried out to achieve the desired balance between maximum equal throughput in any one slot and equal throughput overall by scheduling slot allocations to mobile stations.

The steps are as follows:—
1. Compare the throughput of the mobile terminals in the coverage area and select those with the lowest throughput to form the group to be scheduled during the current interval (Step 20);
2. Allocate transmit power among the signals to be transmitted to the mobile terminals of the group in accordance with the method described above—that is in order to maximise the aggregate capacity of the group (Eqn. 3) (Step 22);
3. Schedule a fixed number of bits to the group and apportion these bits among the members of the group according to the relative quality of the channels to each mobile terminal in the group (Steps 24 and 26);
4. Transmit the signals to each mobile terminal in the group until all of the scheduled bits have been sent.
5. Calculate the throughput to each mobile terminal in the coverage area.
6. Repeat steps 1-5.

Beamforming in an SDMA (Space Division Multiple Access) System

SDMA beamforming presents a very similar power allocation problem to distributed MIMO and hence the same power allocation algorithm (Eqn. 2) is appropriate for SDMA beamforming.

Figure 8:
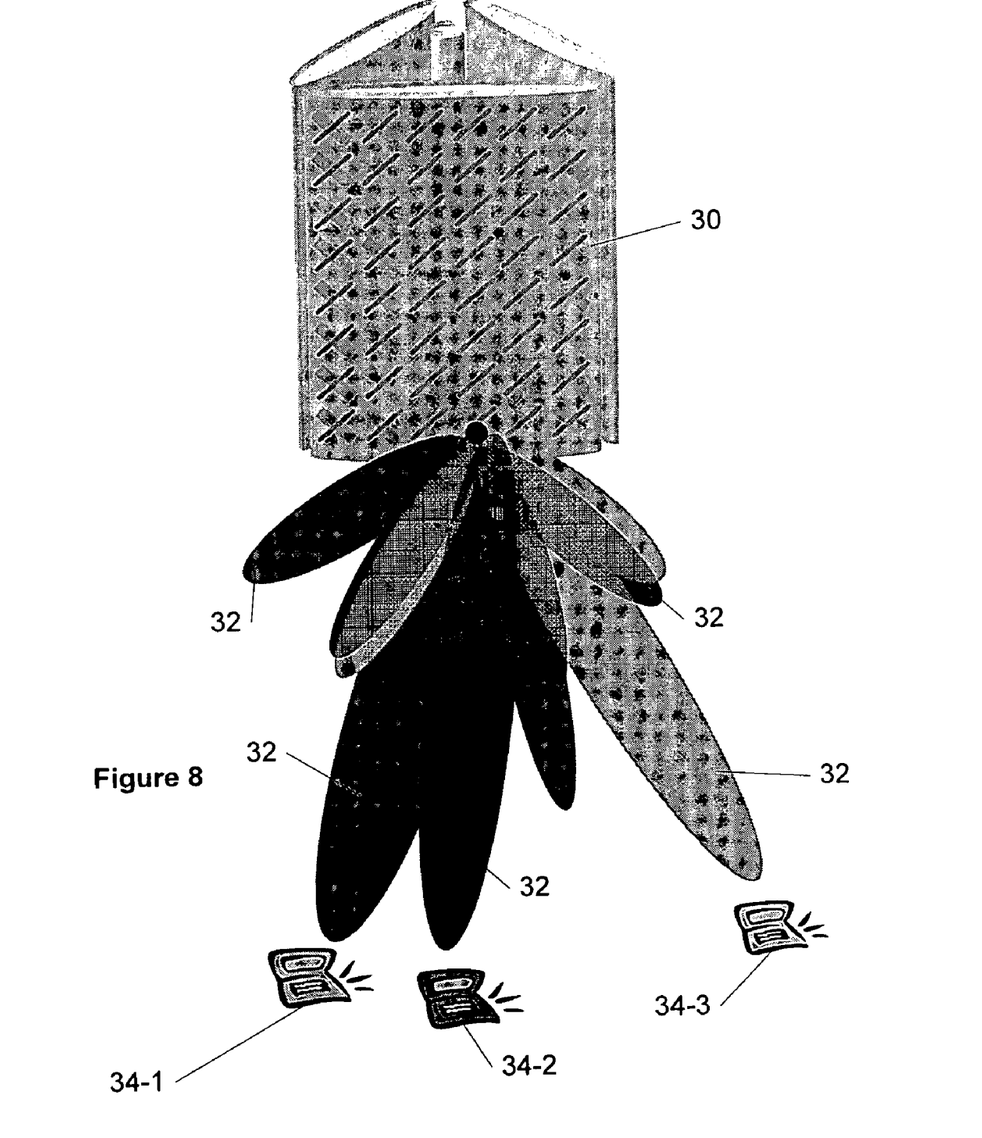
FIG. 8 is schematic diagram of an SDMA network.

FIG. 8 shows an example SDMA system, with a close spaced antenna array 30 which creates multiple beams 32, serving simultaneous users 34-1 to 34-3.

Typically the power assigned to each beam is equal and this has been shown to give excellent capacity improvements. For the SDMA system to work effectively, the beams must be near orthogonal and this may be achieved through appropriate scheduling of users as described in the above mentioned copending patent application and also in or advanced algorithms such as dirty paper coding We may approximate the EQT capacity (Eqn. 1) by, replacing $\lambda_{11}$ and $\lambda_{22}$, with (signal to noise plus interference) SINR1 and SINR2 values, respectively. Although there is a second order effect if the users are not fully orthogonal because the power assigned to one user influences the interference seen by the other this effect is small as long as the SDMA system is working well, thus providing good spatial discrimination between users.

To obtain optimum equal throughput capacity in such an SDMA system, it is desirable that the scheduler selects the beams to be excited simultaneously in each time period using the principle of selecting the beams supporting those mobile terminals which have received the lowest throughput prior to the present time period. This scheduling method and method of forming groups is similar to that described above for the distributed MIMO example. Power is then allocated to the beams to be excited according to the value of α calculated as in the distributed MIMO example, with the exception that $SINR_i$ replaces the eigenvalues $\lambda_{ii}$.

What is claimed is:

1. A method of allocating power in the downlink of a distributed MIMO system comprising selecting a group of spatial modes to be served simultaneously, performing channel measurements to derive information about the channel for each spatial mode, calculating the maximum equal throughput for the selected group of modes based on the channel measurements and deriving power allocations for each mode based on the said channel information and the calculated maximum equal throughput.

2. A method according to claim 1, comprising dividing the spatial modes into pairs, deriving the respective eigenvalues $\lambda_{11}$ and $\lambda_{22}$ of the said paired spatial modes, by channel measurement and determining the proportion of transmit power α and 1−α respectively for the two paired spatial modes of the system using the equation $$\frac{1}{\ln[1+\lambda_{22}(1-\alpha)]^2}\frac{\lambda_{22}}{1+\lambda_{22}(1-\alpha)} - \frac{1}{\ln(1+\lambda_{11}\alpha)^2}\frac{\lambda_{11}}{1+\lambda_{11}\alpha} = 0.$$

3. A method according to claim 1 comprising maintaining a record of throughput for a plurality of mobile terminals served by the MIMO system and grouping mobile terminals for service by the MIMO system dependent on their historic throughput.

4. A method according to claim 3, wherein mobile terminals having a lower historic throughput than other terminals are given higher scheduling priority than terminals having higher historic throughput.

5. A method according to claim 1 including choosing an appropriate data rate for each mode dependent on the derived channel information.

6. A method of allocating power in the downlink of an SUMA cellular radio system having a plurality of downlink beams comprising selecting a group of spatial modes to be served simultaneously by respective beams, performing channel measurements to derive information about the channel for each spatial mode, calculating the maximum equal throughput for the selected group of modes based on the channel measurements and deriving power allocations for each beam based on the said channel information and the calculated maximum equal throughput.

7. A method according to claim 6, comprising dividing the spatial modes into pairs, deriving the respective signal to noise plus interference ratios $SINR_1$ and $SINR_2$ of the said paired spatial modes, by channel measurement and determining the proportion of transmit power $\alpha$ and $1-\alpha$ respectively for the beams directed to the two paired spatial modes of the system using the equation $$\frac{1}{\ln[1+SINR_2(1-\alpha)]^2}\frac{SINR_2}{1+SINR_2(1-\alpha)} - \frac{1}{\ln(1+SINR_1\alpha)^2}\frac{SINR_1}{1+SINR_1\alpha} = 0.$$

8. A method according to claim 6 comprising maintaining a record of throughput for a plurality of mobile terminals served by the SDMA system and grouping mobile terminals for service by the SDMA system dependent on their historic throughput.

9. A method according to claim 8, wherein mobile terminals having a lower historic throughput than other terminals are given higher scheduling priority than terminals having higher historic throughput.

10. A method according to claim 6 including choosing an appropriate data rate for each mode dependent on the derived channel information.

11. A base station for a distributed MIMO system comprising an antenna having a plurality of spatially distinct radiating elements, a transmitter coupled to the antenna and operable to vary transmit power separately for each said element, a receiver operable to receive channel information about channels to mobile stations and a scheduler arranged to create groupings of mobile stations to be served simultaneously by the base station, the transmitter being further arranged to calculate the maximum equal throughput for the selected group of modes based on the channel measurements and to derive power allocations for each mode based on the said channel information and the calculated maximum equal throughput.

12. A base station according to claim 11, wherein the scheduler is arranged to divide the spatial modes into pairs, and wherein the receiver is arranged to derive the respective eigenvalues $\lambda_{11}$ and $\lambda_{22}$ of the said paired spatial modes, by channel measurement and wherein the transmitter is arranged to determine the proportion of transmit power $\alpha$ and $1-\alpha$ respectively for the two paired spatial modes of the system using the equation $$\frac{1}{\ln[1+\lambda_{22}(1-\alpha)]^2}\frac{\lambda_{22}}{1+\lambda_{22}(1-\alpha)} - \frac{1}{\ln(1+\lambda_{11}\alpha)^2}\frac{\lambda_{11}}{1+\lambda_{11}\alpha} = 0.$$

13. A base station for an SDMA cellular radio system comprising an antenna operable to produce a plurality of downlink beams, a transmitter coupled to the antenna and operable to vary transmit power separately for each beam, a receiver operable to receive channel information about channels to mobile stations and a scheduler arranged to create groupings of mobile stations to be served simultaneously by the base station, the transmitter being further arranged to calculate the maximum equal throughput for the selected group of mobile stations based on the channel measurements and to derive power allocations for each beam based on the said channel information and the calculated maximum equal throughput.

14. A base station according to claim 13, wherein the scheduler is arranged to divide the beams into pairs, and wherein the receiver is arranged to derive the respective signal to noise plus interference ratios $SINR_1$ and $SINR_2$ of the said paired spatial beams, by channel measurement and wherein the transmitter is arranged to determine the proportion of transmit power $\alpha$ and $1-\alpha$ respectively for the two paired beams of the system using the equation $$\frac{1}{\ln[1+SINR_2(1-\alpha)]^2}\frac{SINR_2}{1+SINR_2(1-\alpha)} - \frac{1}{\ln(1+SINR_1\alpha)^2}\frac{SINR_1}{1+SINR_1\alpha} = 0.$$

* * * * *